No. 818,973. PATENTED APR. 24, 1906.
R. & J. A. MEDLEY.
KETTLE.
APPLICATION FILED JULY 18, 1905.
2 SHEETS—SHEET 1.
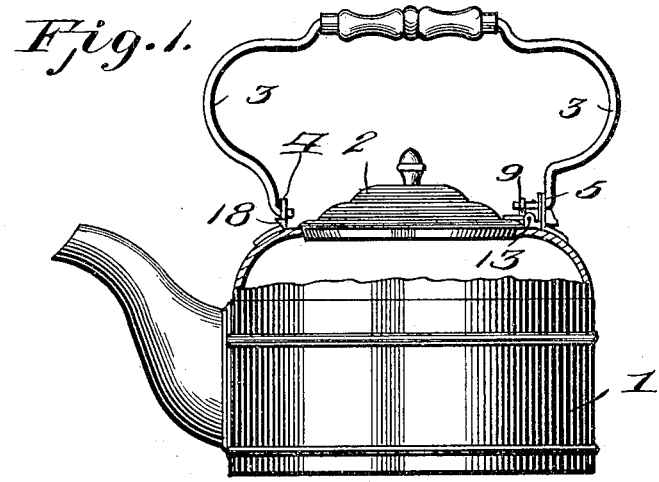
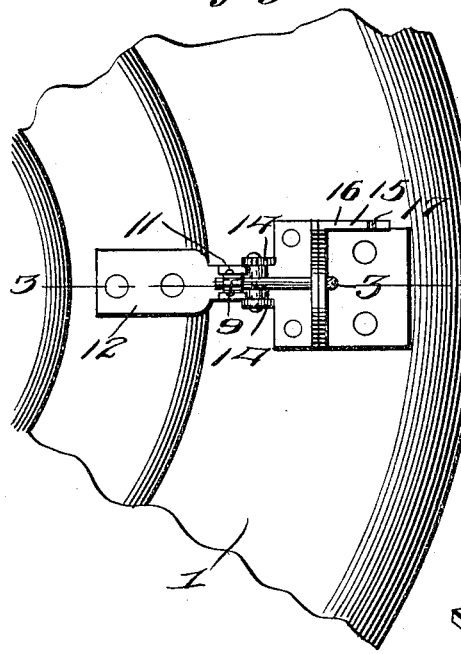
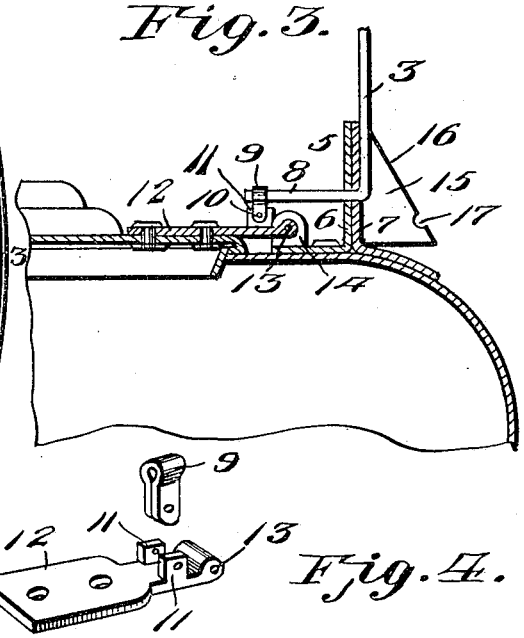
Witnesses
Frank B. Hoffman
Inventors
James A. Medley,
Robert Medley
By Victor J. Evans
Attorney No. 818,973. PATENTED APR. 24, 1906.
R. & J. A. MEDLEY.
KETTLE.
APPLICATION FILED JULY 18, 1905.

2 SHEETS—SHEET 2.

Witnesses
Frank B. Hoffman.

Inventors
James A. Medley,
Robert Medley
By Victor J. Evans
Attorney

UNITED STATES PATENT OFFICE.

ROBERT MEDLEY AND JAMES A. MEDLEY, OF CHIPPEWA FALLS, WISCONSIN.

KETTLE.

No. 818,973.  Specification of Letters Patent.  Patented April 24, 1906.

Application filed July 18, 1905. Serial No. 270,258.

*To all whom it may concern:*

Be it known that we, ROBERT MEDLEY and JAMES A. MEDLEY, citizens of the United States of America, residing at Chippewa Falls, in the county of Chippewa and State of Wisconsin, have invented new and useful Improvements in Kettles, of which the following is a specification.

This invention relates to tea-kettles and analogous culinary vessels having a lid or cover, and has for its objects to produce a comparatively simple inexpensive device of this character in which the lid will be automatically moved to open position through the medium of the bail or handle, one in which the lid will be locked by the latter in open position, and one wherein movement of the bail to transporting position will serve to automatically close the lid.

With these and other objects in view the invention comprises the novel features of construction and combination of parts more fully hereinafter described.

Figure 5:
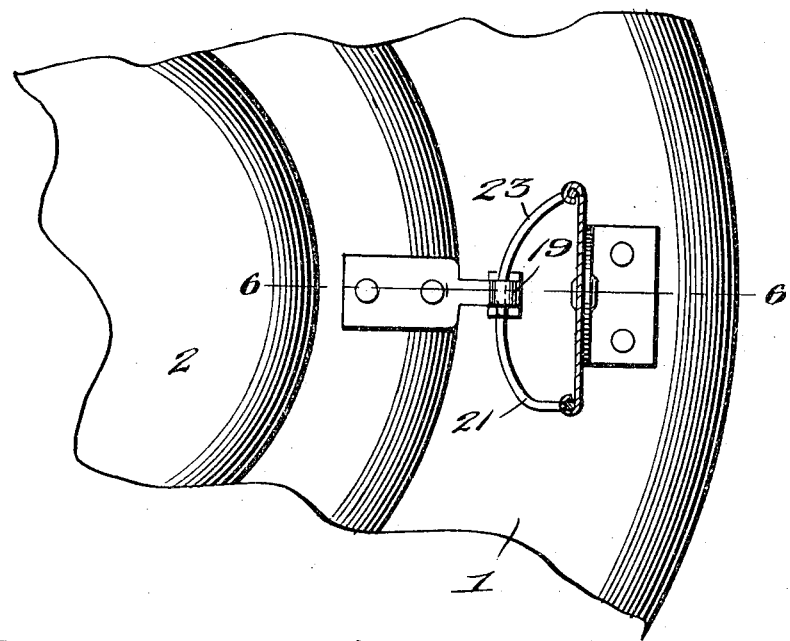
Figure 6:
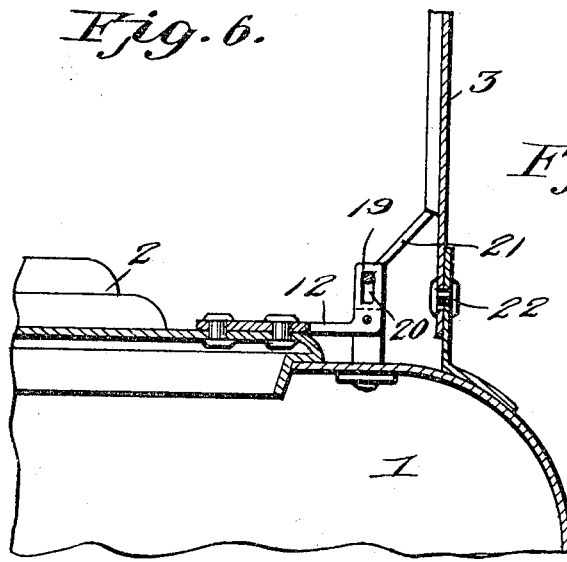
Figure 7:
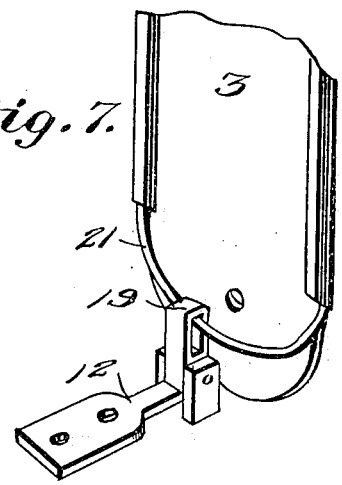

In the accompanying drawings, Figure 1 is a side elevation, partly in section, of a kettle equipped with the improved lid-operating devices and showing one form of embodiment of the invention. Fig. 2 is an enlarged detail plan view of the lid-operating devices. Fig. 3 is a section taken on the line 3 3 of Fig. 2. Fig. 4 is a detail perspective view of the lid-carrying hinge and the bail-engaging member. Fig. 5 is a view similar to Fig. 2, showing another embodiment of the invention. Fig. 6 is a section taken on the line 6 6 of Fig. 5. Fig. 7 is a detail perspective view of the lid-operating devices.

Referring to the drawings, and particularly to Figs. 1 to 4, 1 designates a kettle provided with a lid 2 and having a bail or handle 3, pivoted in ears 4 and 5 to swing in a vertical plane, these parts, except as hereinafter explained, all being of the usual or any appropriate construction and material and designed to perform their ordinary functions. The ear 5, which is preferably composed of a pair of sheet-metal sections or plates 6 and 7, is perforated for pivotal engagement by the adjacent end of the bail 3, the pivoted end of which latter is provided with a horizontal inwardly-projecting arm or extension 8, loosely embraced by an engaging member or clip 9, in turn pivoted, as at 10, between a pair of ears 11, formed adjacent the outer end of a hinge member or leaf 12, riveted or otherwise fixedly secured to the lid 2, said leaf being pivoted at its outer end, as at 13, between a pair of ears 14, provided on and arising vertically from the horizontal portion of the section or plate 6. The section 7 has formed at one edge of its vertical portion an angularly-disposed outwardly-projecting cam portion 15, having its outer edge 16 downwardly and outwardly beveled or inclined and provided adjacent its lower end with a notch or recess 17, constituting a seat for the reception of the bail 3, for a purpose which will presently appear. The ear 4 is perforated for pivotal engagement by the adjacent end of the bail and is provided with outwardly-extending stop members or lugs 18, with which the bail may contact when in folded position to obviate the same resting upon the vessel.

In practice when the bail or handle 3 is in vertical transporting position, as illustrated in Figs. 1 and 3, the lid 2 will remain closed and be maintained in such position, owing to connection of arm 8 with the hinge-leaf 12. When, however, the bail is turned to its normal inactive position, it will ride over the inclined face 16 of the cam portion 15, thereby moving the arm 8 longitudinally outward and serving, through engagement of the arm with the hinge member 12, to raise the lid, which latter will be locked in open position by engagement of the bail with the recess 17. It is to be observed that owing to the arm 8 being journaled in the clip 9 and the latter being pivotally engaged with the hinge-leaf the parts will have proper relative movement during the movements of the lip, and, further, that when the bail is turned to vertical position the natural springiness of the bail will cause the latter to move the lid automatically to closed position.

In the form of device illustrated in Figs 5 to 7 the hinge-leaf 12 is provided at its outer pivoted end with an upturned portion or extension 19, slotted at 20 to receive and for engagement with a substantially U-shaped member or loop 21, preferably composed of wire and having its terminals fixed to the handle or bail 3 at a point above the pivotal axes 22 of the latter, the member 21 being formed with an inclined or cam portion 23, adapted when the handle is swung to inactive position to act in conjunction with the extension 19 for moving the lid to open position, it being understood that when the handle is moved to vertical transporting position the lid will automatically close by gravity. In all other respects the construction and operation of the parts is practically identical with that above described.

From the foregoing it is apparent that we produce a comparatively simple inexpensive device admirably adapted for the attainment of the ends in view, it being understood that minor changes in the details herein set forth may be resorted to without departing from the spirit of the invention.

Having thus described the invention, what is claimed is—

1. In a device of the class described, a vessel having a lid, a hinge member fixed to the latter and pivotally connected with the vessel, an ear fixed upon the vessel, a handle pivoted to the ear to swing in a vertical plane, said handle being operatively connected with the hinge member for moving the lid to open position, said handle and ear being one provided with a cam portion designed to act upon the other for operating the handle to open the lid.

2. In a device of the class described, a vessel having a lid, a hinge member fixed to the latter and pivotally connected with the vessel, an ear fixed to the latter and provided with a cam portion, and a handle pivoted in the ear to swing in a vertical plane and having an arm operatively connected with the hinge member, said cam portion being designed to act upon the handle for moving the lid to open position.

3. In a device of the class described and in combination with a vessel and its lid, of a hinge member fixed to the latter and pivotally connected with the vessel, an ear provided on the vessel and having a cam portion recessed to form a seat, a handle pivoted in said ear to swing in a vertical plane, an arm provided on the handle and a clip engaged with the arm and pivotally connected with the hinge member.

In testimony whereof we affix our signatures in presence of two witnesses.

ROBERT MEDLEY.
JAMES A. MEDLEY.

Witnesses:
A. B. WILLIAMS,
T. J. CONNOR.